United States Patent
Tatsumi

(10) Patent No.: US 10,249,031 B2
(45) Date of Patent: Apr. 2, 2019

(54) IMAGE PROCESSING APPARATUS, IMAGE PROCESSING METHOD, PROGRAM, AND NON-TRANSITORY COMPUTER-READABLE STORAGE MEDIUM

(71) Applicant: CANON KABUSHIKI KAISHA, Tokyo (JP)

(72) Inventor: Eisaku Tatsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 15/508,956

(22) PCT Filed: Sep. 11, 2015

(86) PCT No.: PCT/JP2015/004627
§ 371 (c)(1),
(2) Date: Mar. 6, 2017

(87) PCT Pub. No.: WO2016/056173
PCT Pub. Date: Apr. 14, 2016

(65) Prior Publication Data
US 2017/0278227 A1  Sep. 28, 2017

(30) Foreign Application Priority Data
Oct. 6, 2014 (JP) ................. 2014-205700

(51) Int. Cl.
*G06T 5/00* (2006.01)
*H04N 1/60* (2006.01)
*G06T 5/20* (2006.01)

(52) U.S. Cl.
CPC ............... *G06T 5/008* (2013.01); *G06T 5/20* (2013.01); *H04N 1/6005* (2013.01);
(Continued)

(58) Field of Classification Search
None
See application file for complete search history.

(56) References Cited

U.S. PATENT DOCUMENTS

| 5,446,504 A | 8/1995 | Wada |
| 6,278,445 B1 | 8/2001 | Tanaka et al. |

(Continued)

FOREIGN PATENT DOCUMENTS

| JP | H06-319149 A | 11/1994 |
| JP | 2006-285063 A | 10/2006 |
| WO | 2013/046095 A1 | 4/2013 |

OTHER PUBLICATIONS

Simulating and compensating changes in appearance between day and night vision. Wanat et al., 2014.*

(Continued)

*Primary Examiner* — Delomia L Gilliard
(74) *Attorney, Agent, or Firm* — Venable LLP

(57) ABSTRACT

An image processing apparatus for displaying an image on a display screen, inputs data, specifies at least one of a bright region and a dark region of an image corresponding to the image data, executes, for at least one of the bright region and the dark region, at least one of first chroma processing of increasing a chroma of the bright region, second chroma processing of lowering the chroma of the dark region, first hue processing of making a hue of the bright region close to red, and second hue processing of making the hue of the dark region close to blue in accordance with display dynamic range information corresponding to the display screen, and displays, on the display screen, an image based on corrected image data that has undergone correction.

20 Claims, 10 Drawing Sheets

(52) U.S. Cl.
CPC ......... *H04N 1/6008* (2013.01); *H04N 1/6075* (2013.01); *G06T 2207/10024* (2013.01); *G06T 2207/20204* (2013.01); *H04N 2201/0089* (2013.01)

(56) References Cited

U.S. PATENT DOCUMENTS

| | | |
|---|---|---|
| 8,576,925 B2 | 11/2013 | Itokawa et al. |
| 8,705,882 B2 | 4/2014 | Tatsumi |
| 8,718,396 B2 | 5/2014 | Tatsumi |
| 2010/0091034 A1 | 4/2010 | Matsumoto et al. |
| 2010/0134682 A1 | 6/2010 | Sakaniwa et al. |
| 2014/0210847 A1* | 7/2014 | Knibbeler .............. G09G 5/006 345/589 |

OTHER PUBLICATIONS

Wanat, Robert et al. "Simulating and compensating changes in appearance between day and night vision", ACM Transactions on Graphics, vol. 33, No. 4, Article 147, Jul. 2014.

* cited by examiner

[Fig. 1]
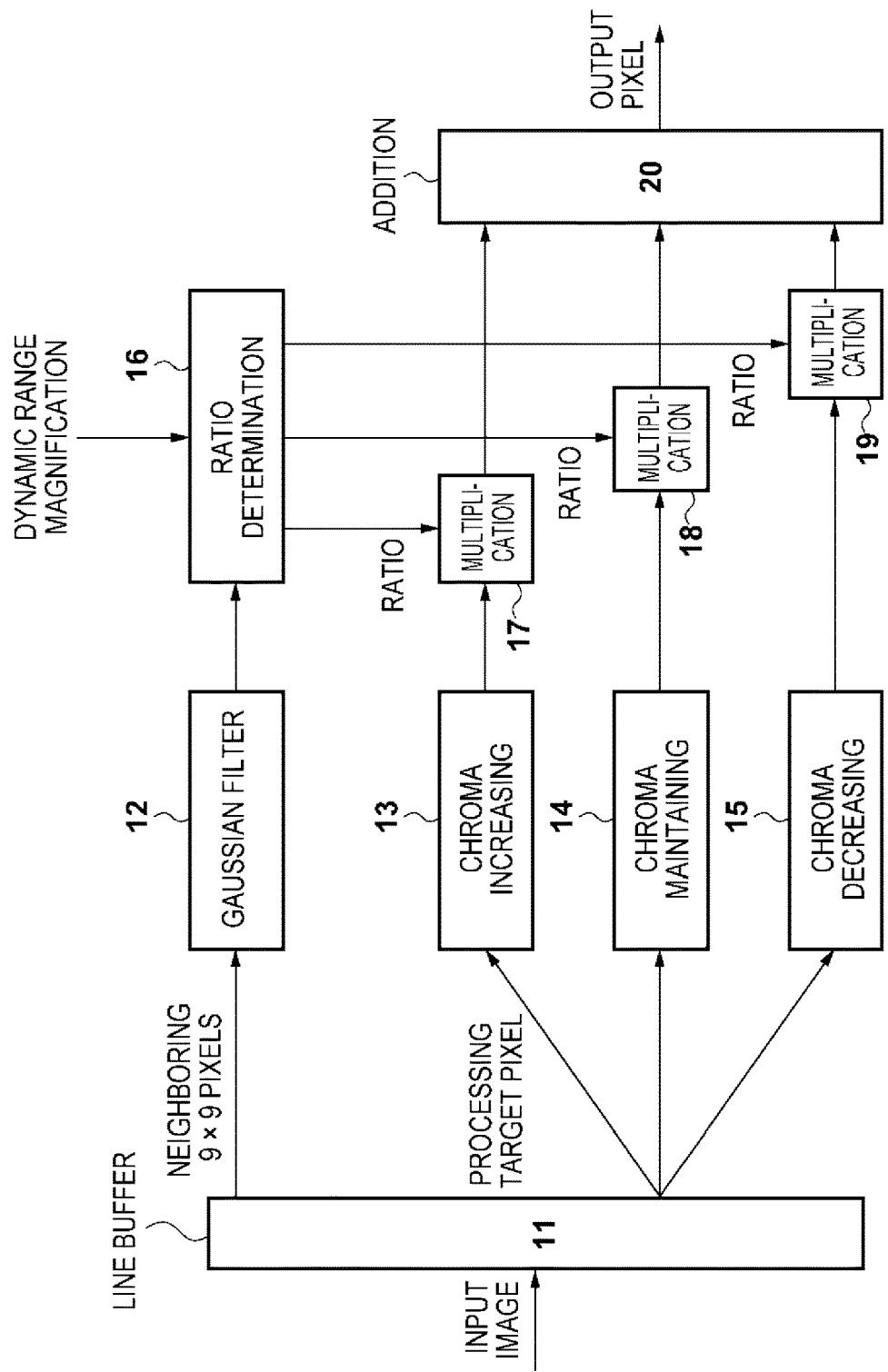

[Fig. 2]
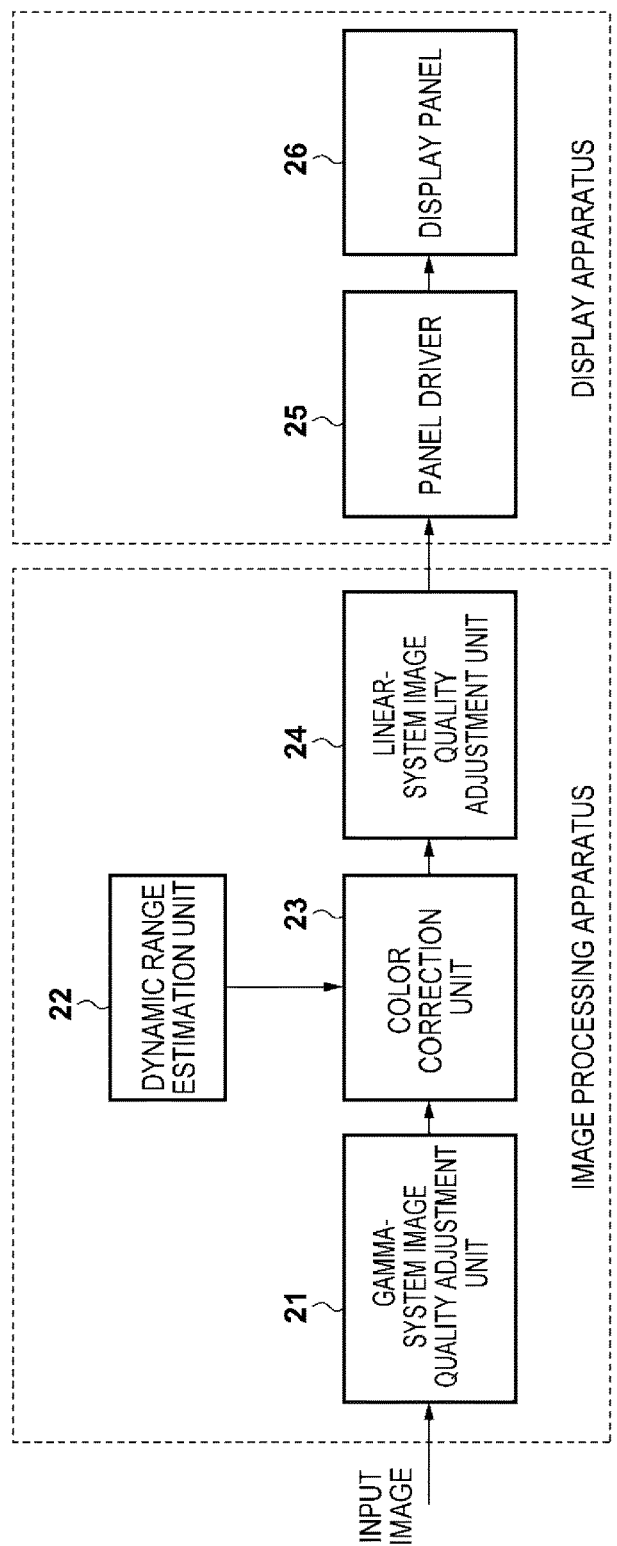

[Fig. 3]
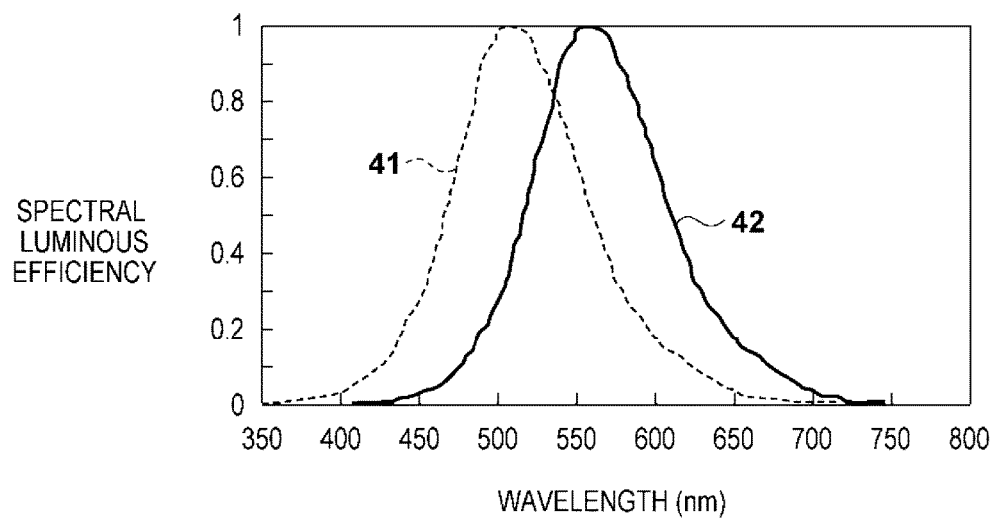
[Fig. 4]
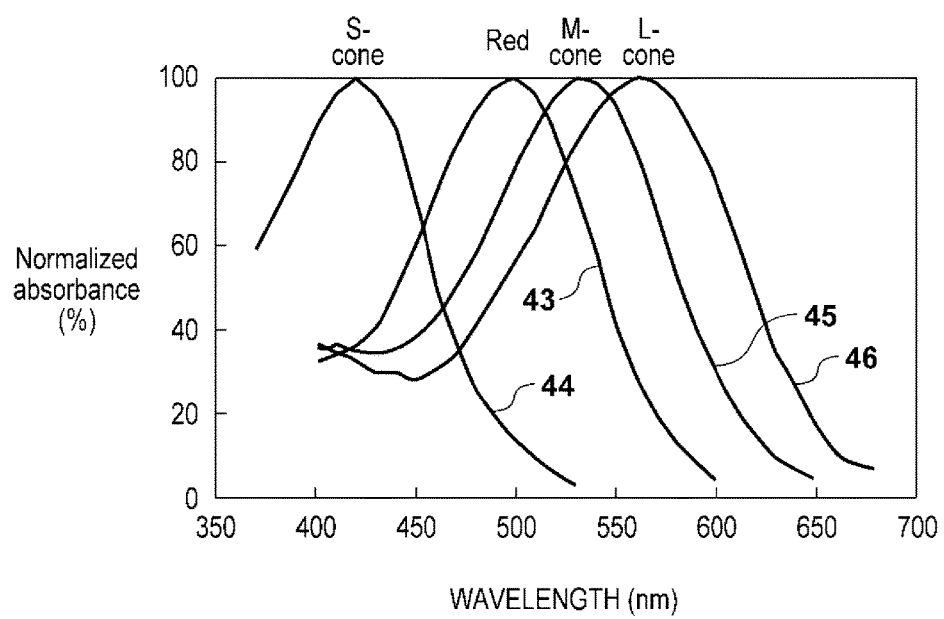

[Fig. 5A]
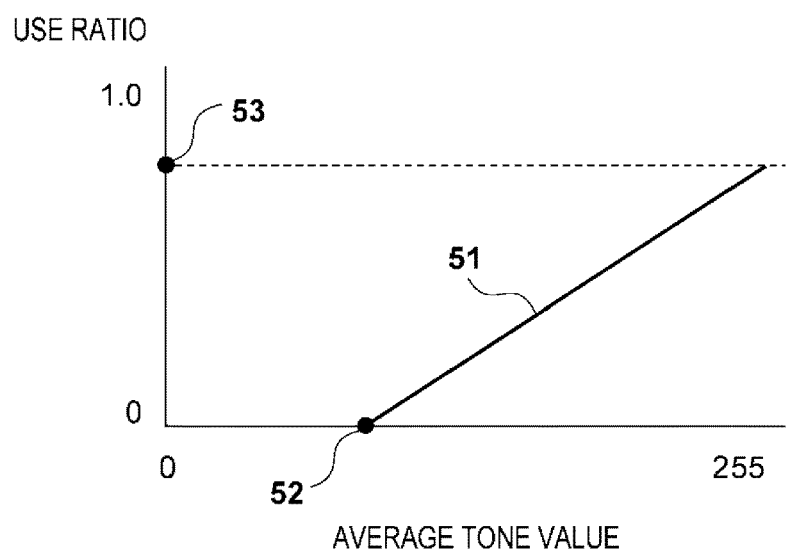
[Fig. 5B]
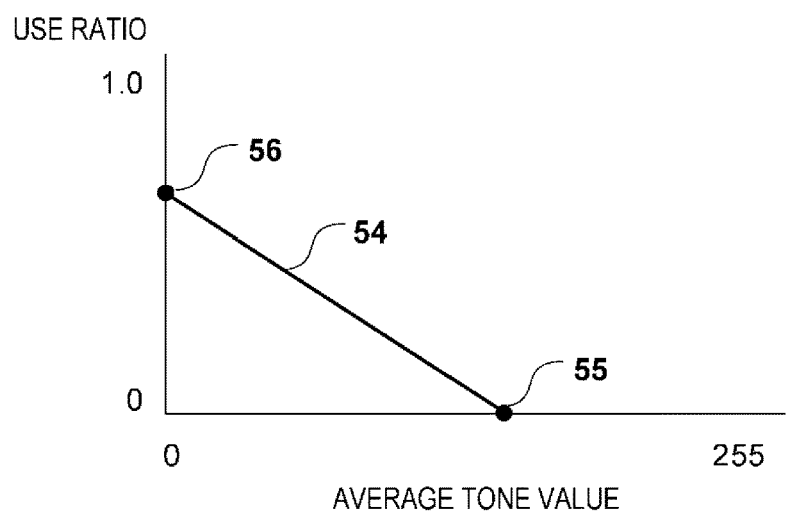

[Fig. 6]
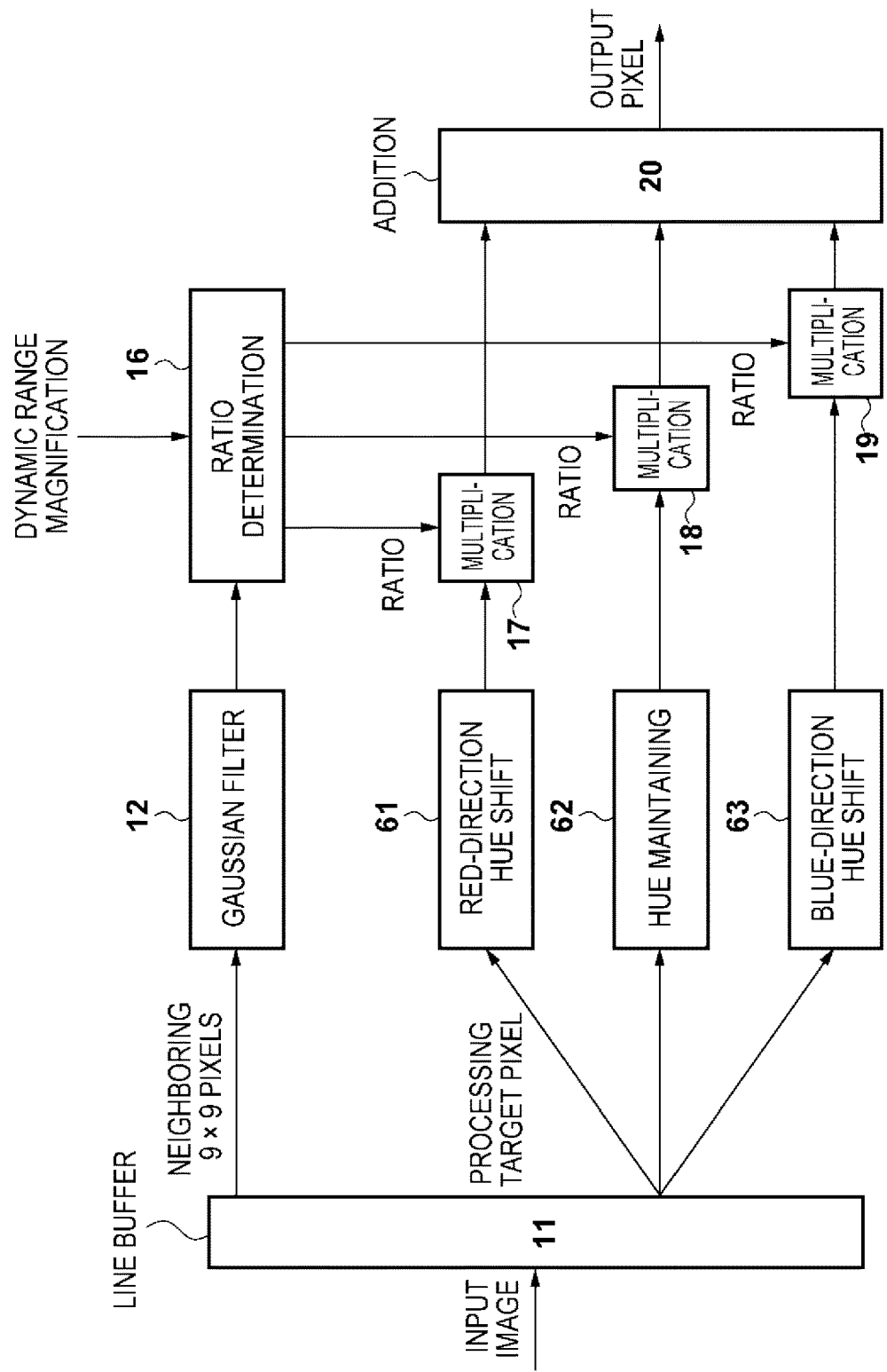

[Fig. 7A]
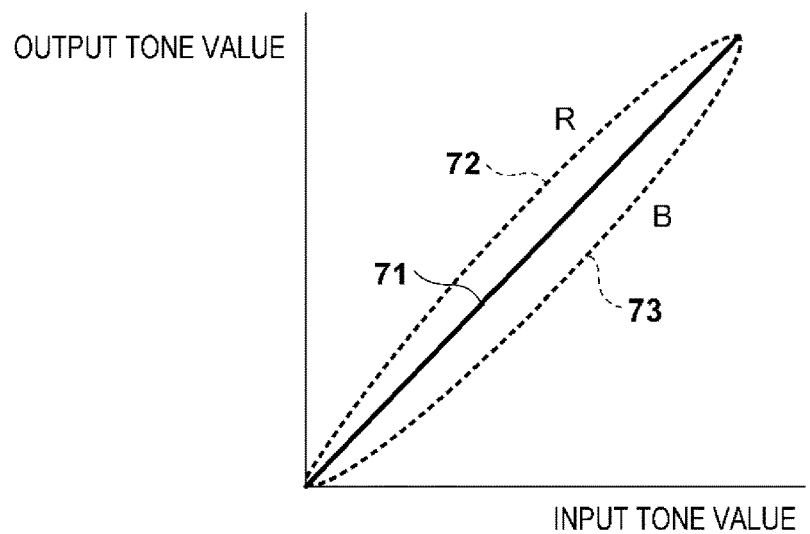
[Fig. 7B]
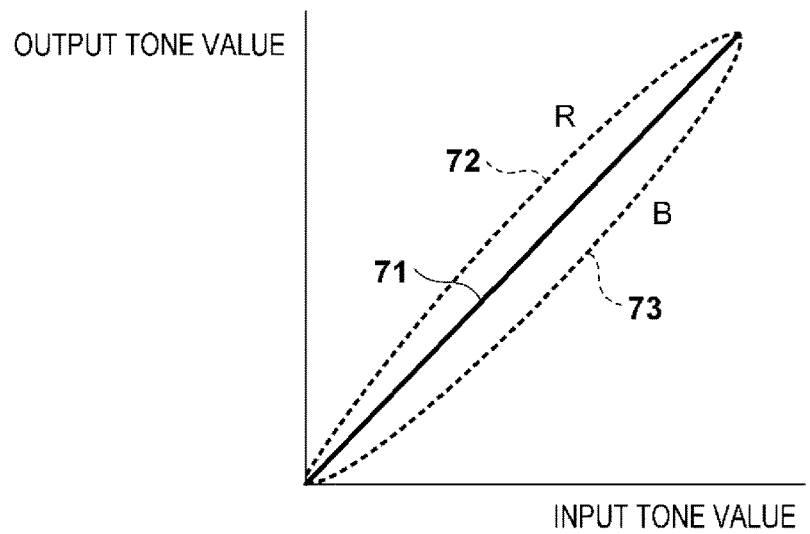

[Fig. 8]
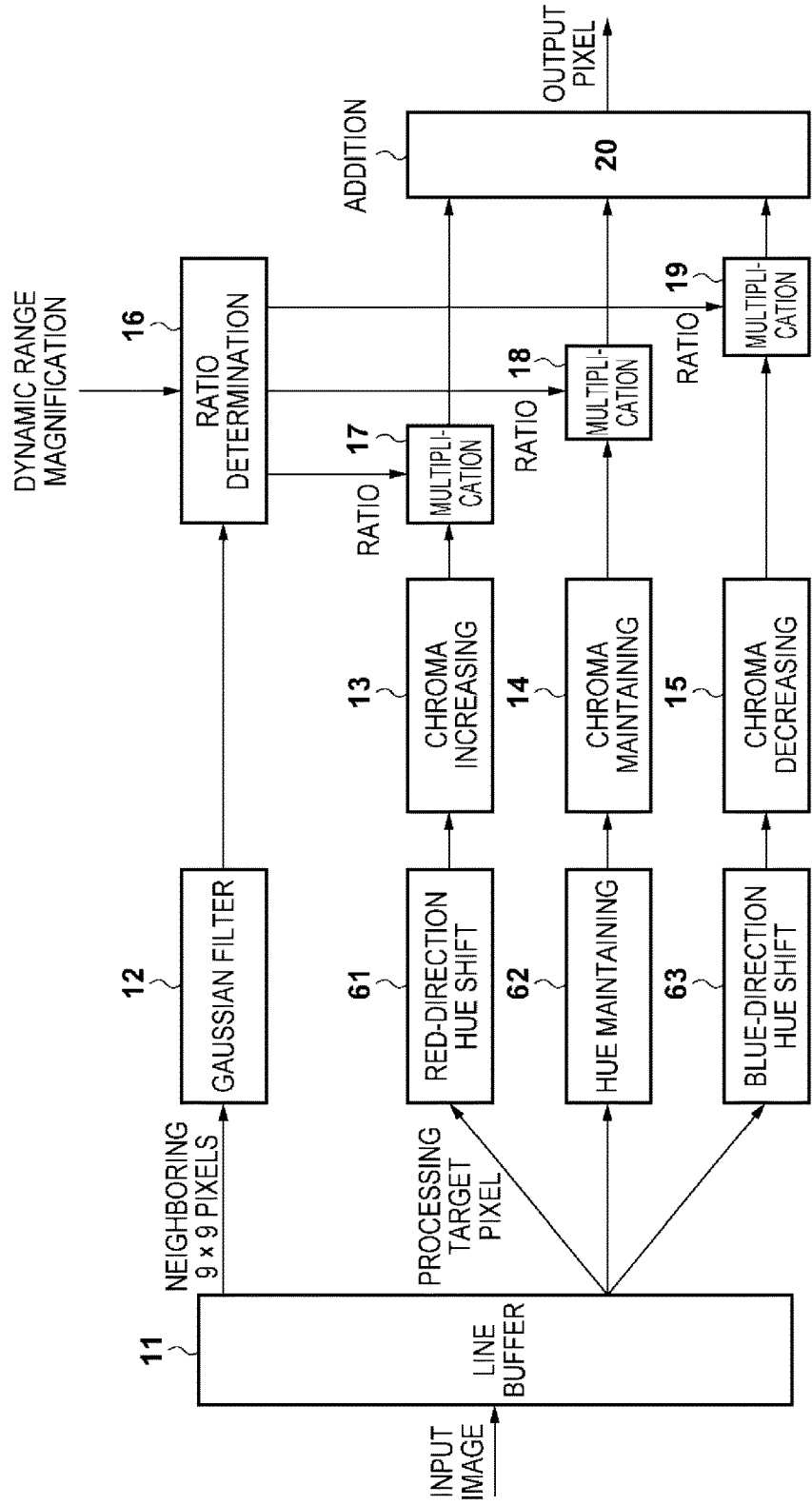

[Fig. 9]
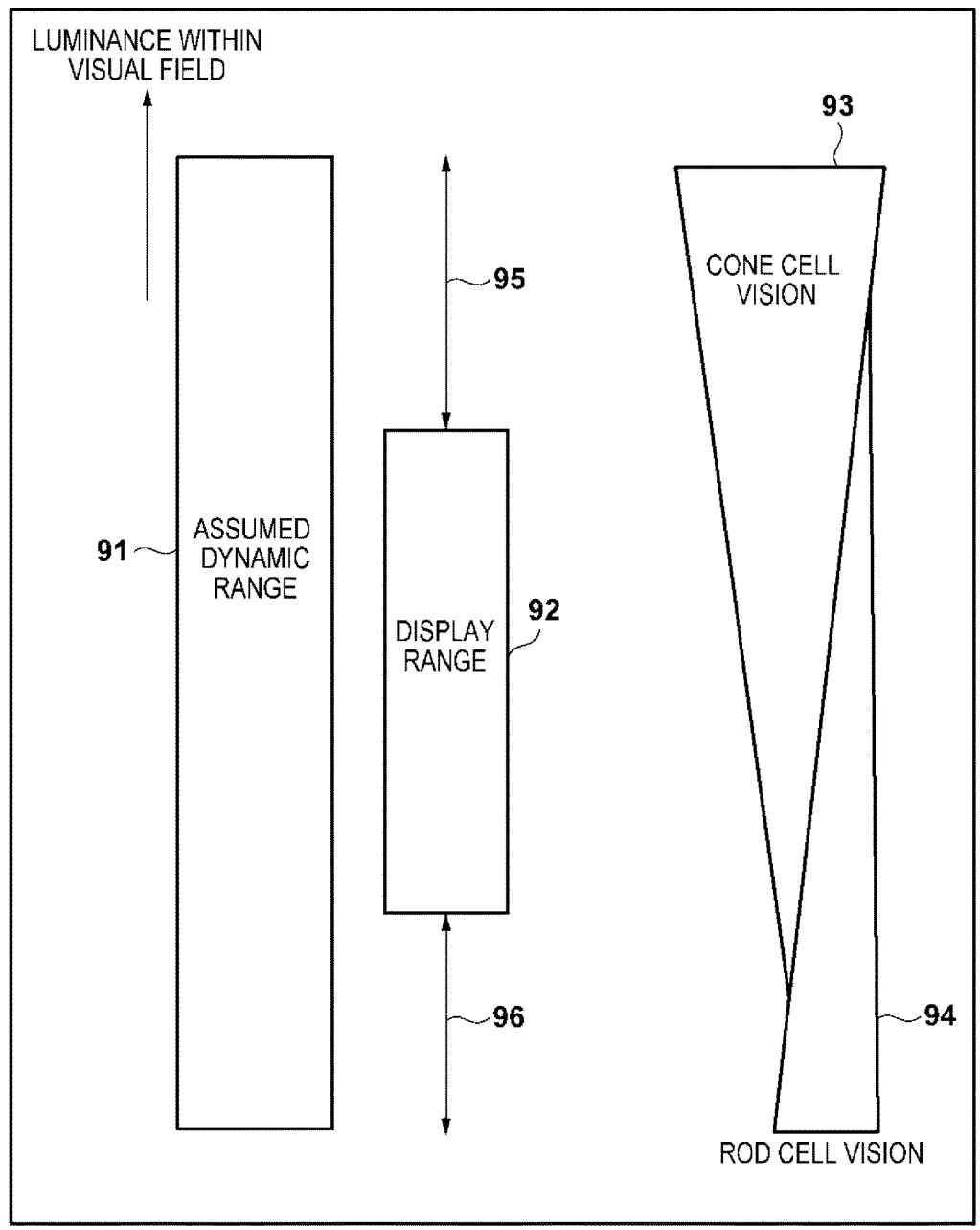

[Fig. 10]
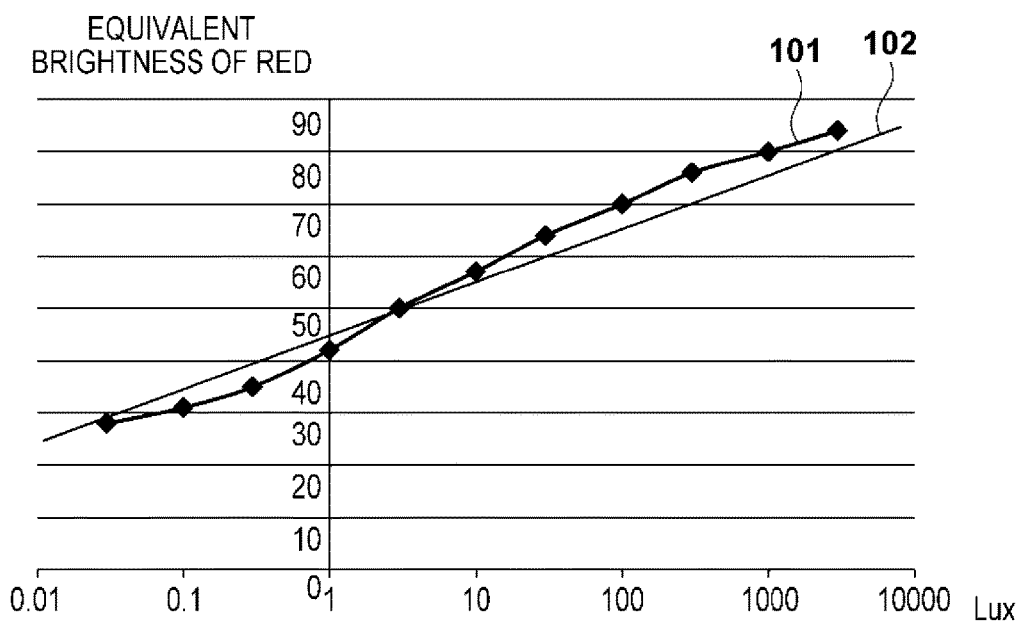

[Fig. 11]
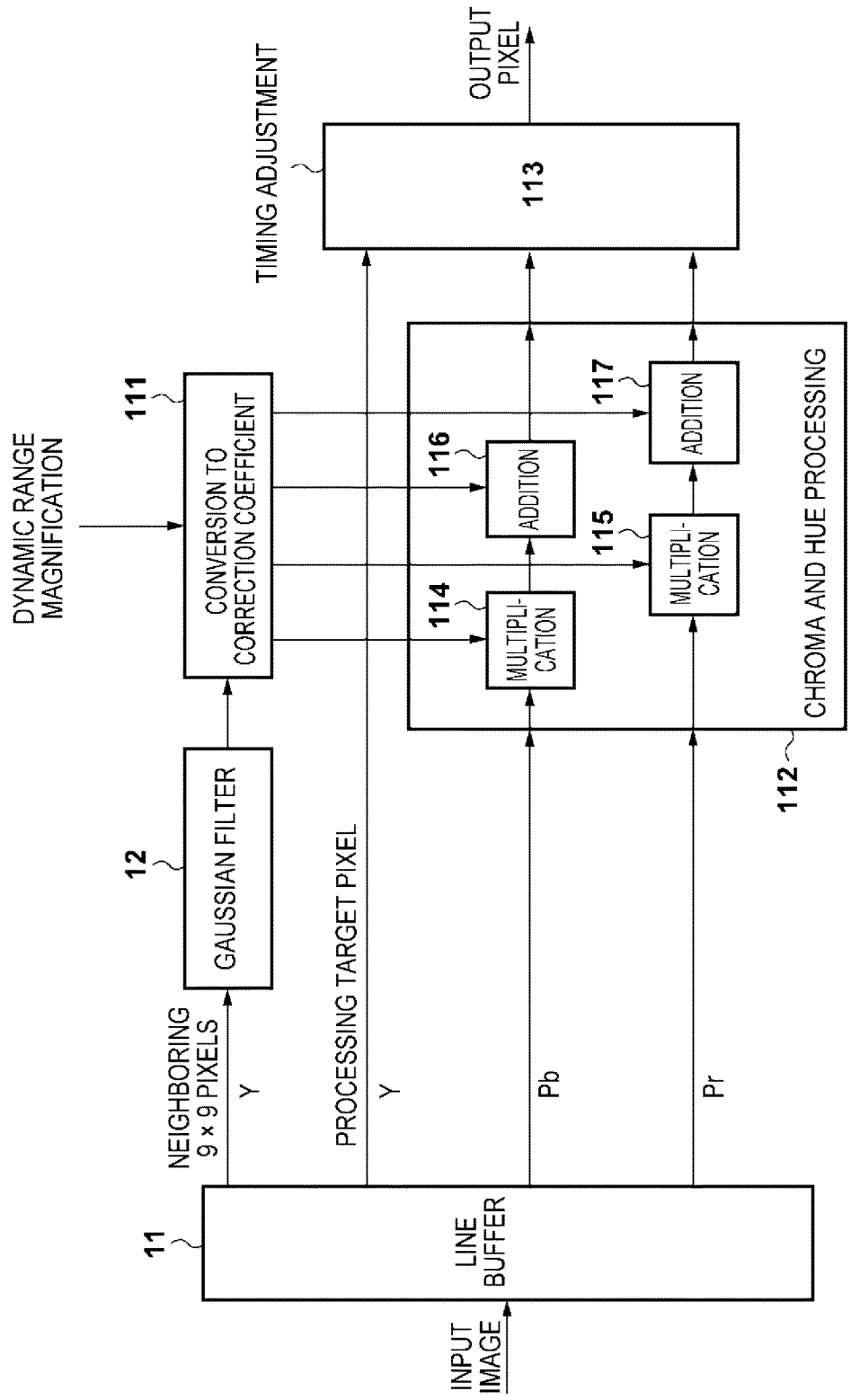

IMAGE PROCESSING APPARATUS, IMAGE PROCESSING METHOD, PROGRAM, AND NON-TRANSITORY COMPUTER-READABLE STORAGE MEDIUM

TECHNICAL FIELD

The present invention relates to an image processing technique and, more particularly, to an image processing technique for improving image quality according to the dynamic range of an apparatus.

BACKGROUND ART

As a technique of correcting a contrast on a display apparatus having a narrow dynamic range, conventionally, a dynamic gamma correction technique is known which widens tone portions numerous on a histogram that is a luminance distribution. When a viewer views a display apparatus in a bright environment, the dynamic range lowers even if the original dynamic range of the display apparatus is wide. To cope with this, there exists a technique of performing gamma correction for enhancing the contrast or increasing the color density based on illuminance around the display apparatus.

As a characteristic of an eye having two types of visual cells, that is, cone cells and rod cells, the working ratio between the two types of visual cells is known to change depending on brightness. This is because the cone cells are mainly active in a brighter environment, and the rod cells are mainly act in a darker environment. Such a change in the visual property according to brightness is called Purkinje transition. The cone cell can recognize three, RGB colors, whereas the rod cell can recognize only monochrome colors. Additionally, the center frequency of sensitivity changes between the cone cell and the rod cell. The rod cell has a higher sensitivity to blue than to red. Hence, if the ratio of rod cell vision increases, that is, the rod cells are mainly active in a dark environment, a phenomenon in which the color density or color temperature looks different due to Purkinje transition occurs.

Japanese Patent Laid-Open No. 2006-285063 describes correcting the color temperature or color density in accordance with Purkinje transition that occurs depending on the viewing environment. More specifically, Japanese Patent Laid-Open No. 2006-285063 describes that when an ambient brightness and an APL (Average Picture Level) value are lower than predetermined levels, image processing is performed so as to increase the color temperature and increase the color density. Note that the APL value is a value obtained by averaging the number of tones of the image of one frame of a video.

One image that is a video content is created assuming that the dynamic range of a display apparatus is, for example, about 2,000. However, some display apparatuses actually viewed by viewers have dynamic ranges narrower than 2,000 in terms of performance. Also, in some display apparatuses, the dynamic range lowers due to a bright viewing environment, or the dynamic range lowers because light emitted by a projector is reflected by a screen, and the light re-reflected on the viewer side reaches the screen again. In such a display apparatus or viewing environment, the assumed content perception, that is, the dynamic range of about 2,000 is not implemented.

Under these circumstances, correction processing using a gamma curve is performed to cope with the decrease in the contrast. At this time, image quality degrades due to clipped chroma in bright portions. Hence, processing of increasing the color density is performed to attain a perception similar to that assumed. At this time, color graininess occurs in dark portions. The method described in Japanese Patent Laid-Open No. 2006-285063 corrects the influence of Purkinje transition only when the display and environment are dark, and therefore, cannot cope with lowering of the dynamic range that occurs in a bright environment. The same problem as described above exists also when the dynamic range of a printing apparatus is low, or the dynamic range of an image recording apparatus is low.

SUMMARY OF INVENTION

According to first aspect of the present invention, there is provided an imaging processing apparatus for displaying an image on a display screen, the imaging processing apparatus comprising: input means for inputting image data; specifying means for specifying at least one of a bright region and a dark region of an image corresponding to the image data input by the input means; correction means for executing, for at least one of the bright region and the dark region specified by the specifying means, at least one of first chroma processing of increasing a chroma of the bright region, second chroma processing of lowering the chroma of the dark region, first hue processing of making a hue of the bright region close to red, and second hue processing of making the hue of the dark region close to blue in accordance with display dynamic range information corresponding to the display screen; and display control means for displaying, on the display screen, an image based on corrected image data that has undergone correction by the correction means.

According to second aspect of the present invention, there is provided an image processing method of displaying an image on a display screen, the method comprising: a specifying step of specifying at least one of a bright region and a dark region of an image corresponding to input image data; a correction step of executing, for at least one of the bright region and the dark region, at least one of first chroma processing of increasing a chroma of the bright region, second chroma processing of lowering the chroma of the dark region, first hue processing of making a hue of the bright region close to red, and second hue processing of making the hue of the dark region close to blue in accordance with display dynamic range information corresponding to the display screen; and a displaying control step of displaying, on the display screen, an image based on corrected image data that has undergone correction in the correction step.

According to third aspect of the present invention, there is provided a program that causes a computer to execute: a specifying step of specifying at least one of a bright region and a dark region of an image corresponding to input image data; a correction step of executing, for at least one of the bright region and the dark region specified in the specifying step, at least one of first chroma processing of increasing a chroma of the bright region, second chroma processing of lowering the chroma of the dark region, first hue processing of making a hue of the bright region close to red, and second hue processing of making the hue of the dark region close to blue in accordance with display dynamic range information corresponding to a display screen; and a display control step of displaying, on the display screen, an image based on corrected image data that has undergone correction in the correction step.

According to fourth aspect of the present invention, there is provided a non-transitory computer-readable storage medium storing a computer program for causing a computer to execute: a specifying step of specifying at least one of a bright region and a dark region of an image corresponding to input image data; a correction step of executing, for at least one of the bright region and the dark region specified in the specifying step, at least one of first chroma processing of increasing a chroma of the bright region, second chroma processing of lowering the chroma of the dark region, first hue processing of making a hue of the bright region close to red, and second hue processing of making the hue of the dark region close to blue in accordance with display dynamic range information corresponding to a display screen; and a display control step of displaying, on the display screen, an image based on corrected image data that has undergone correction in the correction step.

Further features of the present invention will become apparent from the following description of exemplary embodiments (with reference to the attached drawings).

BRIEF DESCRIPTION OF DRAWINGS

FIG. 1 is a block diagram showing the arrangement of the color correction unit of an image processing apparatus according to the first embodiment.

FIG. 2 is a block diagram showing the overall arrangement of a display apparatus incorporating the image processing apparatus according to the first embodiment FIG. 3 is a reference view showing the CIE standard spectral luminous efficiency.

FIG. 4 is a reference view showing the spectral sensitivities of visual cells.

FIG. 5A is a graph for explaining the relationship between a ratio and an average tone value.

FIG. 5B is a graph for explaining the relationship between a ratio and an average tone value.

FIG. 6 is a block diagram showing the arrangement of the color correction unit of an image processing apparatus according to the second embodiment.

FIG. 7A is an explanatory view of lookup tables used to correct a hue according to the second embodiment.

FIG. 7B is an explanatory view of lookup tables used to correct a hue according to the second embodiment.

FIG. 8 is a block diagram showing the arrangement of the color correction unit of an image processing apparatus according to the third embodiment.

FIG. 9 is a view for explaining composite vision of cone cell vision and rod cell vision with respect to visual field luminance.

FIG. 10 is a graph showing the equivalent brightness of red with respect to illuminance.

FIG. 11 is a block diagram showing the arrangement of the color correction unit of an image processing apparatus according to the fourth embodiment.

DESCRIPTION OF EMBODIMENTS

The relationship between Purkinje transition and brightness around a display apparatus and image perception by a viewer will be described first with reference to FIGS. 3, 4, 9, and 10.

FIG. 3 is a reference view showing the CIE standard spectral luminous efficiency that represents the human average visual property. In FIG. 3, the abscissa represents the wavelength (nm) of light, and the ordinate represents the spectral luminous efficiency. Two curves in FIG. 3 are a visibility curve 41 of scotopic vision and a visibility curve 42 of photopic vision. FIG. 3 is a graph showing comparison between the characteristic of photopic vision and that of scotopic vision. In the visibility curve 42 of photopic vision, the peak wavelength of sensitivity is about 570 nm. In the visibility curve 41 of scotopic vision, the peak wavelength of sensitivity is about 500 nm. As described above, the ratio of rod cell vision increases in a dark environment. Hence, in the dark environment, the viewer feels the short wavelength side as bright, and the color of an object looks bluish, as can be seen from FIG. 3. Conversely, in a bright environment, since the ratio of cone cell vision increases, the viewer feels the long wavelength side as bright, and the color of an object looks reddish, as can be seen.

FIG. 4 is a reference view showing the spectral sensitivities of visual cells. FIG. 4 is a graph showing comparison between the spectral sensitivity of a cone cell and that of a rod cell on a color basis. Four curves in FIG. 4 are a spectral sensitivity curve 43 of a rod, a spectral sensitivity curve 44 of a blue cone, a spectral sensitivity curve 45 of a green cone, and a spectral sensitivity curve 46 of a red cone. As is apparent from FIG. 4, the cone has different sensitivities for the three primary colors: blue, green, and red, and the rod has a sensitivity of one color. Since the ratio of rod cell vision increases in the dark environment, as described above, the color components apparently decrease in the dark environment, as can be seen from FIG. 4. That is, as it becomes dark, a color looks light (i.e., the chroma looks low), as can be seen. Conversely, as it becomes bright, a color looks dark (i.e., the chroma looks high), as can be seen. The rod cells and the cone cells are widely distributed on the retina while being mixed. The ratio of rod cell vision increases in a dark portion of an image, and the ratio of cone cell vision increases in a bright portion. For this reason, if an image comes into focus on the retina, the chroma appears to be low in the dark portion and high in the bright portion due to the characteristic shown in FIG. 4.

FIG. 9 is a view for conceptually explaining composite vision of cone cell vision and rod cell vision with respect to visual field luminance. The ordinate of FIG. 9 represents visual field luminance. The visual field luminance rises, that is, the brightness increases upward. Referring to FIG. 9, a range 91 is the range of the visual field luminance of the dynamic range assumed for an image, and a range 92 is the range of the visual field luminance of the dynamic range displayed on a screen. A range 93 is the ratio of a luminance range in which cone cell vision is performed, a range 94 is the ratio of a luminance range in which rod cell vision is performed, a range 95 is a luminance range that is short on the bright side, and a range 96 is a luminance range that is short on the dark side.

The cone cells are mainly active when the visual field luminance is high (i.e., bright). On the other hand, the rod cells are mainly active when the visual field luminance is low (i.e., dim). For this reason, the ranges of visual field luminance of the cone cell vision and the rod cell vision have tapered ratios, like the ranges 93 and 94, respectively. The composite sensitivity of the rod cell vision and the cone cell vision has the composite shape of the ranges 93 and 94. As is apparent from FIG. 4, as for the composite sensitivity of the cone cell vision and the rod cell vision (i.e., the composite range of the ranges 93 and 94), the cone cell vision has great influence in the high visual field luminance, and the rod cell vision has great influence in the low visual field luminance.

Consider the range 91 of the dynamic range assumed for a content (e.g., image) and the range 92 of the dynamic range actually displayed on the screen. The dynamic range of BT709 that is a typical standard of TV broadcasting is only about 850. This dynamic range is too narrow and causes clipped chroma. Hence, in a normal shooting camera, the high tone region is incorporated 200% to 400% by a gamma curve (knee function). The range 91 of the dynamic range assumed for content thus changes to about 2,000 to 3,000.

The range 92 of the actually displayed dynamic range may be about 500 depending on the performance of the display apparatus, or about 100 due to the influence of external light or reflected light of display. In this case, the composite ratio of cone cell vision and rod cell vision changes between the range 91 of the assumed dynamic range and the range 92 of the actually displayed dynamic range. When the composite ratio of cone cell vision and rod cell vision changes, image perception changes due to the perception difference between the cone cell vision and the rod cell vision.

In this embodiment, a technique is provided which corrects the hue or chroma of an image by an amount corresponding to the difference in the ratio so as to show an image with a dynamic range close to an originally assumed dynamic range. More specifically, concerning the range 95 short on the bright side, the image processing apparatus according to this embodiment performs one or both of correction of changing the hue to the red side and correction of increasing the chroma as correction of raising the ratio of cone cell vision, as described with reference to FIGS. 3 and 4. Concerning the range 96 short on the dark side, the image processing apparatus according to this embodiment performs one or both of correction of changing the hue to the blue side and correction of lowering the chroma as correction of raising the ratio of rod cell vision.

How the ratio of composite sensitivity of cone cell vision and rod cell vision changes depending on the illuminance of illumination, that is, ambient brightness will be described here with reference to FIG. 10. FIG. 10 is a graph showing the equivalent brightness of red with respect to illuminance. The abscissa of FIG. 10 represents the illuminance of test illumination, and the ordinate represents the brightness of red light perceived by a subject with respect to white light having the same brightness as the equivalent brightness of red by % (percentage). Two graphs shown in FIG. 10 are a graph 101 that shows the equivalent brightness of red with respect to a change in the illuminance, and an auxiliary graph 102. Letting X be the abscissa and Y be the ordinate, the auxiliary graph 102 exhibits a relationship $Y=45+10 \times \log X$ and is indicated by a straight line because the abscissa is the logarithmic axis.

As described above with reference to FIGS. 3 and 4, the cone cell vision has a high sensitivity to red, and the rod cell vision has a low sensitivity to red. The ratio of cone cell vision is high when the illuminance is high, and the ratio of rod cell vision is high when the illuminance is low. Hence, the graph 101 is the result of composition of both effects in FIGS. 3 and 4 and is assumed to represent the ratio of cone cell vision.

The image processing apparatus according to this embodiment obtains correction parameters used to eliminate the difference between the assumed dynamic range and the actually seen dynamic range based on the graphs shown in FIG. 10. The auxiliary graph 102 has a characteristic representing that if the illuminance changes by 10 times, the equivalent brightness changes by 10%. The slope of the graph 101 is obtained by comparison with the auxiliary graph 102. As can be seen, in a range where the illuminance is 1 to 100, the equivalent brightness changes by 10% (inclusive) to 20% (inclusive) for each change of 10 times, and in a range where the illuminance is 1 or less or 100 or more, the equivalent brightness changes by 5% (inclusive) to 10% (inclusive) for each change of 10 times. That is, as for the correction ratio by the change of the dynamic range, every time the dynamic range changes by 10 times, correction can appropriately be done within the range of 5% to 20% in which the average is 10%.

The present invention will be described below in detail based on preferred embodiments. Note that the arrangements shown in the embodiments are merely examples, and the present invention is not limited to the illustrated arrangements.

First Embodiment

The arrangement and operation of an image processing apparatus according to the first embodiment will be described below with reference to FIGS. 1, 2, and 5. FIG. 2 is a block diagram showing the overall arrangement of a display apparatus incorporating the image processing apparatus according to this embodiment. A gamma-system image quality adjustment unit 21 performs image quality correction of gamma system for an input image. A dynamic range estimation unit 22 generates (i.e., determines) a dynamic range reduction ratio. A color correction unit 23 corrects the colors of the image in accordance with the dynamic range reduction ratio generated (i.e., determined) by the dynamic range estimation unit 22. A linear-system image quality adjustment unit 24 performs image quality correction of a linear system. A panel driver 25 converts an image signal into a display panel driving signal. A display panel 26 is a panel configured to display the image. Note that an image input unit is not illustrated because an input image is generally obtained by decoding a signal received by an external input or tuner.

The input image input to the display apparatus is normally an image of gamma system to which a gamma value of 2.2 is applied. The gamma-system image quality adjustment unit 21 performs gamma-system image processing such as resizing in the gamma system for the input image. The dynamic range estimation unit 22 generates the dynamic range reduction ratio based on a dynamic range assumed for the content, the actual dynamic range of the display apparatus, and the dynamic range reduction ratio by an ambient illuminance. Note that the dynamic range assumed for the content will be referred to as an assumed dynamic range, and the dynamic range of the display apparatus will be referred to as a display dynamic range hereinafter.

The accrual display dynamic range is estimated based on the ambient illuminance and the initial value of the display dynamic range. The initial value of the display dynamic range is obtained by measuring the white luminance of the display apparatus and the black luminance or a luminance of tone=1 at the time of shipment from the factory. For a single image processing apparatus without the panel driver 25 and the display panel 26, the user sets the initial value of the display dynamic range to a value of, for example, 500 or 1,000. The ambient illuminance can be estimated using an illuminance sensor or illuminometer (not shown). The dynamic range estimation unit 22 estimates the actual display dynamic range based on the thus obtained ambient illuminance and the initial value of the display dynamic range. If the illuminance sensor or the like does not exist, the user sets the actual display dynamic range to an appropriate value.

The dynamic range estimation unit 22 estimates the dynamic range reduction ratio by the ambient illuminance using an illuminance sensor or illuminometer (not shown). The illuminance sensor senses the ambient illuminance. The higher (i.e., brighter) the illuminance is, the narrower the dynamic range is. If the illuminance sensor or the like does not exist, the user sets the dynamic range reduction ratio by the ambient illuminance to a value of, for example, ⅕ or 1/20.

The assumed dynamic range is a dynamic range assumed for a content, as described above. The image processing apparatus can receive the assumed dynamic range via communication with a generation apparatus such as a shooting apparatus for generating the content. Hence, the assumed dynamic range can also be called a generation dynamic range. In this embodiment, a value from 1,000 times to 10,000 times can be used as the assumed dynamic range. For example, the initial value is set to 2,000. The user can change the assumed dynamic range within an excellent dynamic range depending on the content to be displayed.

Based on the assumed dynamic range, the actual display dynamic range, and the dynamic range reduction ratio by the ambient illuminance which are obtained in the above way, the dynamic range estimation unit 22 calculates a reduction ratio SK of the dynamic range by $$SK = DD/CD \times K$$

where DD is the actual display dynamic range, CD is the assumed dynamic range, and K is the dynamic range reduction ratio by the ambient illuminance.

For example, if the actual display dynamic range of the output destination is DD=500, the assumed dynamic range is CD=2000, and the dynamic range reduction ratio by the ambient illuminance is K=1/3, the reduction ratio SK of the dynamic range is obtained as $$SK = (500/2000) \times (1/3) = 1/12$$

The dynamic range estimation unit 22 inputs the reduction ratio SK of the dynamic range calculated in this way to the color correction unit 23.

The color correction unit 23 corrects colors based on the image input from the image quality correction unit of gamma system and a dynamic range correction magnification obtained from the reciprocal of the reduction ratio input from the dynamic range estimation unit 22. Details will be described later with reference to FIG. 1. Note that if the actual display dynamic range is sufficiently wide and higher than the assumed dynamic range, color correction processing need not be performed. Hence, processing by the color correction unit 23 is omitted, and the image is directly output. Since the output from the color correction unit 23 is a linear-system output, the linear-system image quality adjustment unit 24 performs image quality adjustment such as edge enhancement processing of linear system. FIG. 2 illustrates a display apparatus incorporating the image processing apparatus. However, the image processing apparatus may be separated from the display apparatus and connected to the preceding stage of the display apparatus.

Correction of a decrease in the dynamic range using the difference of color density perception between cone cell vision and rod cell vision will be described next. An example of color correction processing by correcting chroma that is a color density will be described with reference to FIG. 1. FIG. 1 is a block diagram showing the arrangement of the color correction unit 23 of the image processing apparatus according to the first embodiment.

A line buffer 11 temporarily saves an input image. A Gaussian filter 12 calculates and acquires a neighborhood average value from neighboring pixels of a processing target pixel as a reference tone value. A chroma increasing unit 13 increases the chroma of the processing target pixel. A chroma maintaining unit 14 only adjusts the timing without changing the chroma of the processing target pixel. A chroma decreasing unit 15 decreases the chroma of the processing target pixel. A ratio determination unit 16 determines the use ratio of each processing target pixel based on the neighborhood average value obtained from the Gaussian filter 12 and the dynamic range correction magnification, and distributes the use ratio. A multiplication unit 17 is a multiplier that multiplies an image whose chroma has been increased by the use ratio obtained from the ratio determination unit 16. A multiplication unit 18 is a multiplier that multiplies an image whose chroma is maintained by the use ratio obtained from the ratio determination unit 16. A multiplication unit 19 is a multiplier that multiplies an image whose chroma has been decreased by the use ratio obtained from the ratio determination unit 16. An addition unit 20 is an adder that adds the outputs of the three multiplication units 17 to 19.

The input image is input to the line buffer 11. Note that in this embodiment, if the input image is an image in the RGB system color space, the color space is converted into a luminance/color difference system color space (YPbPr), and processing is then performed for the sake of ease. Since a normal input image is input by raster scan, the line buffer 11 holds images of lines in number necessary for the Gaussian filter 12. For example, if the Gaussian filter 12 is a 9×9 filter, the line buffer 11 holds images of nine lines. Note that the Gaussian filter 12 performs calculation using only a tone value Y of a luminance signal, the tone value Y need only have a saving width corresponding to nine lines. As for the Pb and Pr signals that are color difference signals, it is necessary to hold only five lines during a period until calculation of the processing target pixel is enabled.

The Gaussian filter 12 calculates the average tone value in the neighboring region of the current processing target pixel. Note that another filter such as an average value filter may be used as the Gaussian filter 12 in place of the Gaussian filter. When an average value filter is used, the circuit scale becomes small, although the influence of a pixel far part from the processing target pixel becomes large. As for the size of the Gaussian filter 12, if 9×9 is too large, a smaller size such as 7×7 or 5×5 may be used. If the size is small, the result of correction processing is somewhat poor. Note that the circuit scale can be minimized by setting the processing target pixel itself to the average tone value (i.e., reference tone value). In this case, image quality can be improved only slightly.

As described above, when the Gaussian filter 12 calculates the average tone value in the neighborhood of the processing target pixel, to what extent the processing target pixel belongs to a bright portion or a dark portion can easily be calculated. That is, the Gaussian filter 12 can specify a bright region and a dark region of the processing target pixel (i.e., image data). If the circuit scale can be made large, superpixel processing or division integration which is a kind of image area separation can be performed. By performing image area separation, a region including the processing target pixel can be determined. Hence, when the circuit scale is made large, more appropriate correction can be performed using the average tone value of the region of the processing target pixel so as to, for example, prohibit bright portion processing for a local bright portion in a dark region.

The chroma increasing unit 13 can easily implement chroma increasing by performing conversion processing so as to increase each of the Pb and Pr signals that are color difference signals to 1 to 1.3 times. In this method, however, clipped chroma occurs. To avoid this, the chroma increasing unit 13 may perform conversion processing using a lookup table for not linear interpolation but curve interpolation. The chroma maintaining unit 14 shifts the processing target pixel by an amount corresponding to the number of clocks delayed by processing of the chroma increasing unit 13. The chroma decreasing unit 15 can easily implement chroma decreasing by performing conversion processing so as to decrease each of the Pb and Pr signals that are color difference signals to 1 to 0.7 times. Note that like the chroma increasing unit 13, the chroma decreasing unit 15 may perform conversion processing using a lookup table for not linear interpolation but curve interpolation.

A correction magnification that is a value equal to or less than the reciprocal value of the dynamic range reduction ratio estimated by the dynamic range estimation unit 22 is input to the ratio determination unit 16. For example, if the dynamic range reduction ratio is 1/12, a correction magnification of 12× or less is input. If a value larger than 12× is set as the correction magnification, the resultant image output from the color correction unit 23 is overcorrected. Based on the input correction magnification and the average tone value, the ratio determination unit 16 calculates use ratios for the chroma increasing unit 13, the chroma maintaining unit 14, and the chroma decreasing unit 15 with respect to the average tone value.

Referring to FIG. 10, a change in the equivalent brightness of red with respect to brightness is almost linear with respect to the logarithm of brightness. Since a tone value having the index of a gamma value of 2.2 is linear with respect to the logarithmic axis, the equivalent brightness is preferably changed almost linearly with respect to the tone value. Let chroma change=0 near the center of the average tone value. Execution of chroma change can be implemented by increasing the chroma as the average tone value becomes high and decreasing the chroma as the average tone value becomes low.

An example in which the use ratio of each pixel is continuously changed by the average tone value (i.e., reference tone value) will be described with reference to FIGS. 5A and 5B. FIGS. 5A and 5B are graphs for explaining the relationship between the average tone value and the use ratio. FIG. 5A explains the use ratio for the chroma increasing unit 13, and FIG. 5B explains the use ratio for the chroma decreasing unit 15. In FIGS. 5A and 5B, the abscissa represents the average tone value which is expressed as, for example, an 8-bit (0 to 255) tone value. The ordinate represents the use ratio output from the ratio determination unit 16. FIG. 5A includes a set graph 51 of the chroma increasing unit 13, a tone point 52 corresponding to a use ratio of 0, and a use ratio point 53 corresponding to a full tone value. FIG. 5B includes a set graph 54 of the chroma decreasing unit 15, a tone point 55 corresponding to a use ratio of 0, and a use ratio point 56 corresponding to a tone value of 0.

The tone points 52 and 55 corresponding to the use ratio of 0 are, respectively, a point representing that the chroma is not increased at a tone value equal to or less than the tone point 52, and a point representing that the chroma is not decreased at a tone value equal to or more than the tone point 55. The two point values are points close to the APL value of the displayed image, or in a moving image, points close to the average value of APL values in each image. Note that the two point values can be either equal or different.

The maximum use ratio of the output of the chroma increasing unit 13 is determined by the use ratio point 53 corresponding to the full tone value. The maximum use ratio=use ratio point 53. For example, if the increase magnification of the chroma increasing unit 13 is 1.3×, and the use ratio point 53 is 1.0, the chroma increasing unit 13 increases the Pb and Pr signals to 1.3 times at maximum. If it is assumed that chroma decreasing processing is not performed in a case where the increase magnification of the chroma increasing unit 13 is 1.3×, the use ratio point 53 is 0.5, the remaining use ratio of 0.5 is used for the output of the chroma maintaining unit 14. Hence, 1.3×0.5+1.0× 0.5=1.15, and the chroma increasing unit 13 increases the Pb and Pr signals to 1.15 times at maximum. In this embodiment, the dynamic range correction magnification is preferably 12× or less. As described above with reference to FIG. 10, every time the dynamic range changes by 10 times, correction can appropriately be done within the range of 5% to 20% in which the average is 10%. Hence, as an example of preferable settings, the increase magnification of the chroma increasing unit 13 is set to 1.3×, the use ratio point is set to 0.5 so as to increase the signals to 1.15 times (i.e., increase of 15%) at maximum.

Note that the maximum use ratio of the output of the chroma decreasing unit 15 is determined by the use ratio point 56 shown in FIG. 5B. The processing based on the use ratio is the same as the processing of the chroma increasing unit 13, and a description thereof will be omitted.

The use ratio of the output of the chroma maintaining unit 14 is the remaining use ratio other than the use ratio for chroma increasing and the use ratio for chroma decreasing, and is obtained by subtracting the use ratio for chroma increasing and the use ratio for chroma decreasing from a total use ratio of 1.0. That is, the use ratio of the chroma maintaining unit 14=1.0−(the use ratio of the chroma increasing unit 13+the use ratio of the chroma decreasing unit 15). Note that FIGS. 5A and 5B show linear set graphs for the descriptive convenience. However, they are not limited to linear expressions. Since the characteristic of the actual equivalent brightness of red changes in a curve with respect to the illuminance in FIG. 10, the set graphs are more preferably represented by curves.

The multiplication unit 17 multiplies the output of the chroma increasing unit 13 by the use ratio for the chroma increasing unit 13. Similarly, the multiplication unit 18 multiplies the output of the chroma maintaining unit 14 by the use ratio for the chroma maintaining unit 14. The multiplication unit 19 multiplies the output of the chroma decreasing unit 15 by the use ratio for the chroma decreasing unit 15. The addition unit 20 mixes the outputs of the multiplication units 17 to 19, and outputs a composite pixel.

Note that the image may be processed as RGB values intact without converting them into color difference signals, although it is cumbersome. In this case, the neighborhood average value is obtained based on the sum of RGB values. In this case, processing for chroma increasing is performed using a two-dimensional lookup table that defines a curve to extend the difference between the R and B values. Processing for chroma decreasing is performed using a two-dimensional lookup table that defines a curve to narrow the difference between the R and B values.

In this embodiment, an example has been described in which both processing of increasing the chroma of a bright average tone portion and processing of lowering the chroma of a dark average tone portion are performed. However, only one of them may be performed. In this case, it has been confirmed that the dynamic range is apparently extended to some degree. To decrease the number of correction circuits, performing only one of the processes suffices. It has been confirmed in an actual image that the processing of increasing the chroma of a portion having a bright average tone value can effectively be performed as the only one processing.

In this embodiment, an example has been described in which the chroma increasing unit 13, the chroma maintaining unit 14, and the chroma decreasing unit 15 divisionally perform different processes for the processing target pixel, and after that, the multiplication units 17 to 19 mix the outputs. However, the arrangement example is not limited to this. For example, these units may be integrated into one processing block including a means for increasing or decreasing the chroma in accordance with the average tone value.

As described above, according to this embodiment, at least one of increasing the chroma of a bright average tone portion and lowering the chroma of a dark average tone portion, which are chroma adjustment processes, is performed. This makes it possible to show the image with a dynamic range close to the originally assumed dynamic range.

Second Embodiment

As the second embodiment, an example will be described in which a decrease in the dynamic range is corrected focusing on the difference in the center frequency between cone cell vision and rod cell vision. An example of color correction processing in which the influence of a shift of the center frequency of a sensitivity of composite vision is corrected by correcting a hue in accordance with a partial brightness of an image will be described with reference to FIG. 6.

FIG. 6 is a block diagram showing the arrangement of a color correction unit 23 of an image processing apparatus according to this embodiment. Blocks other than a red-direction hue shift unit 61, a hue maintaining unit 62, and a blue-direction hue shift unit 63 to be described later are the same as in FIG. 1, and a description thereof will be omitted. The red-direction hue shift unit 61 shifts the hue of a processing target pixel in the red direction. The hue maintaining unit 62 adjusts the timing without changing the hue of the processing target pixel. The blue-direction hue shift unit 63 shifts the hue of the processing target pixel in the blue direction.

In this embodiment, both a case where the input image in a luminance/color difference system color space YPbPr and a case where the input image is in an RGB system color space will be described. A method of obtaining the neighborhood average tone value of the processing target pixel is the same as that described in the first embodiment. The processing target pixel itself can be set to the average tone value, as in the first embodiment. Image area separation may be done, and the average tone value of each region may be used.

The amounts of shifts in the red direction and blue direction fall within the range of 5% to 20% for each change of 10 times in the dynamic range, as in the first embodiment. As for the luminance/color difference signals, the red-direction hue shift unit 61 adds a value of about 0.1 to 0.3 to a value obtained by normalizing the Pr signal as a color difference signal to −1.0 to 1.0, and subtracts a value of about 0.1 to 0.3 from a value obtained by normalizing the Pb signal to −1.0 to 1.0. This can easily implement shifting the hue of the processing target pixel in the red direction. If the value is 1.0 or more, the value is limited to 1.0. If the value is −1.0 or less, the value is limited to −1.0.

Note that the values to be added and subtracted (in the above examples, values of about 0.1 to 0.3) can be close values. This is because the chromaticity of an achromatic portion in an image is not so far from the chromaticity curve of black point radiation. Conversely, if values that are largely different are used as the values to be added and subtracted, the achromatic portion in the image overlaps green or violet.

As described above, if the addition and subtraction are simply performed, clipped chroma occurs due to the limitation of the values of the two ends. To avoid this, curve interpolation is performed. For example, when adding 0.2, correction processing is performed using a lookup table such that a value of 0.2 is added from −1.0 to 0.6, a value of 0.15 is added for 0.7, a value of 0.1 is added for 0.8, a value of 0.05 is added for 0.9, and no value is added for 1.0. In subtraction, the same processing as described above is performed in the reverse direction, thereby preventing the value from exceeding −1.0.

The hue maintaining unit 62 shifts the image by an amount corresponding to the number of clocks delayed by processing of the red-direction hue shift unit 61. The blue-direction hue shift unit 63 adds a value of about 0.1 to 0.3 to a value obtained by normalizing the Pb signal as a color difference signal to −1.0 to 1.0, and subtracts a value of about 0.1 to 0.3 from a value obtained by normalizing the Pr signal to −1.0 to 1.0. This can easily implement shifting the hue of the processing target pixel in the blue direction. The blue-direction hue shift unit 63 may perform conversion processing using a lookup table for not linear interpolation but curve interpolation, like the red-direction hue shift unit 61.

In the second embodiment as well, FIGS. 5A and 5B referred to in the first embodiment can similarly be used. A correction magnification to a decrease in the dynamic range is input to a ratio determination unit 16, as in FIG. 1. Based on the input correction magnification, the ratio determination unit 16 calculates use ratios for the red-direction hue shift unit 61, the hue maintaining unit 62, and the blue-direction hue shift unit 63. The relationship between the average tone value and the use ratio is represented as in the first embodiment as described with reference to FIGS. 5A and 5B. Note that the use ratio of an image obtained by shifting the hue to red, the use ratio of an image obtained by shifting the hue to blue, and the use ratio of an image that maintains the hue are output based on a set tone value and the average tone value.

A multiplication unit 17 multiplies the output of the red-direction hue shift unit 61 by the use ratio for the red-direction hue shift unit 61. Similarly, a multiplication unit 18 multiplies the output of the hue maintaining unit 62 by the use ratio for the hue maintaining unit 62, and a multiplication unit 19 multiplies the output of the blue-direction hue shift unit 63 by the use ratio for the blue-direction hue shift unit 63. An addition unit 20 mixes the outputs from the multiplication units 17 to 19 and outputs a composite pixel.

A case where the RGB values are processed intact without converting them into color difference signals will be described. In this case, the neighborhood average value is obtained based on the sum of RGB values. To shift the hue in the red direction, a lookup table that defines a curve to increase the R value and decrease the B value is used. To shift the hue in the blue direction, a lookup table that defines a curve to decrease the R value and increase the B value is used. These lookup tables will be described with reference to FIGS. 7A and 7B.

FIGS. 7A and 7B are explanatory views of lookup tables used to correct a hue according to the second embodiment. FIG. 7A shows a lookup table used to shift the hue in the red direction, and FIG. 7B shows a lookup table used to shift the hue in the blue direction. In each of FIGS. 7A and 7B, the abscissa represents the input tone value, and the ordinate represents the output tone value. In each of FIGS. 7A and 7B, R and B indicate an R tone transformation curve and a B tone transformation curve in the RGB system color space, respectively.

FIGS. 7A and 7B include a line 71 of an output tone value equal to an input tone value, an R tone transformation curve 72 for shifting the hue in the red direction, a B tone transformation curve 73 for shifting the hue in the red direction, an R tone transformation curve 74 for shifting the hue in the blue direction, and a B tone transformation curve 75 for shifting the hue in the blue direction. Each of the curves 72 to 75 for shifting the colors is set to attain a value of 1.1 to 1.3 times or 0.9 to 0.7 times as the tone value at the center, as described above, and follows equal tone values so as to avoid clipped chroma in the bright and dark portions of the tone values. When the curves serving as lookup tables are set in these shapes, the hue of the input image as RGB data can be changed without clipped chroma.

In this embodiment, an example has been described in which both processing of shifting the hue of a bright average tone portion in the red direction and processing of shifting the hue of a dark average tone portion in the blue direction are performed. However, only one of them may be performed. In this case, it has been confirmed that the dynamic range is apparently extended to some degree. To decrease the number of correction circuits, performing only one of the processes suffices. It has been confirmed in an actual image that the processing of shifting the hue of a portion having a bright average tone value in the red direction can effectively be performed as the only one processing.

In this embodiment, an example has been described in which the red-direction hue shift unit 61, the hue maintaining unit 62, and the blue-direction hue shift unit 63 divisionally perform different processes for the processing target pixel, and after that, the multiplication units 17 to 19 mix the outputs. However, the arrangement example is not limited to this. For example, these units may be integrated into one processing block including a means for shifting the hue in the red direction or blue direction in accordance with the average tone value.

As described above, according to this embodiment, at least one of shifting the hue of a bright average tone portion in the red direction and shifting the hue of a dark average tone portion in the blue direction, which are hue adjustment processes, is performed. This makes it possible to show the image with a dynamic range close to the originally assumed dynamic range.

Third Embodiment

The first embodiment in which a decrease in the dynamic range is corrected by adjusting the chroma and the second embodiment in which a decrease in the dynamic range is corrected by adjusting the hue have been described above. Solely in the first embodiment or second embodiment, it is possible to make the dynamic range appear to be extended. However, along with a change in a red color component that should be changed, a blue color component that should remain unchanged also undesirably changes as a side effect.

In the first embodiment, the chroma of a bright portion is increased. If the red color component is increased in the bright portion, the blue color component also increases simultaneously. In addition, if the red color component is decreased in a dark portion, the blue color component also decreases simultaneously. In the second embodiment, if the red color component is increased in a bright portion, the blue color component decreases simultaneously. In addition, if the red color component is decreased in a dark portion, the blue color component increases simultaneously. An object of this embodiment is to eliminate these side effects.

As this embodiment, correction of a decrease in the dynamic range focusing on both the difference of color density perception and the difference in the center frequency of sensitivity between cone cell vision and rod cell vision will be described. A color correction unit 23 according to this embodiment will be described with reference to FIG. 8. FIG. 8 is a block diagram showing the arrangement of the color correction unit 23 of an image processing apparatus according to this embodiment. In FIG. 8, a red-direction hue shift unit 61, a hue maintaining unit 62, and a blue-direction hue shift unit 63 shown in FIG. 6 used in the description of the second embodiment are added to FIG. 1 used in the description of the first embodiment. That is, the color correction unit 23 according to this embodiment performs chroma/hue adjustment. The blocks are the same as in FIGS. 1 and 6, and a description thereof will be omitted.

Each correction processing is the same as described in the first and second embodiments, and a description thereof will be omitted. As for the use ratio of a pixel that has undergone each correction processing, since correction of a decrease in the dynamic range is performed by two kinds of correction processing, correction is performed twice. Hence, in use ratio setting described with reference to FIG. 6, the use ratios can appropriately be set to about 1/2 those in the first and second embodiments. As for the order of correction processing, the hue can be corrected first, and the chroma can be corrected later, as shown in FIG. 8. Although the processes may be performed in the reverse order, clipped chroma readily occurs.

In this embodiment, an example has been described in which both processing of shifting the hue of a bright average tone portion in the red direction and processing of shifting the hue of a dark average tone portion in the blue direction are performed. To decrease the number of correction circuits, performing only one of the processes suffices. Additionally, an example has been described in which both processing of increasing the chroma of a bright average tone portion and processing of lowering the chroma of a dark average tone portion are performed. To decrease the number of correction circuits, performing only one of the processes suffices.

In this embodiment, an example has been described in which the red-direction hue shift unit 61 and a chroma increasing unit 13, the hue maintaining unit 62 and a chroma maintaining unit 14, and the blue-direction hue shift unit 63 and a chroma decreasing unit 15 divisionally perform the processes, and the multiplication units 17 to 19 mix the outputs. However, these units may be integrated into one or two processing blocks including a means for shifting the hue in the red direction or blue direction and increasing or decreasing the chroma in accordance with the average tone value.

Fourth Embodiment

Next, as the fourth embodiment, concerning an image processing apparatus including a processing block for shifting the hue in the red direction or blue direction and increasing or decreasing the chroma in accordance with the average tone value, the difference from the first embodiment will mainly be described.

FIG. 11 is a block diagram showing the arrangement of a color correction unit 23 included in the image processing apparatus according to this embodiment. Blocks other than a correction coefficient conversion unit 111, a chroma and hue processing unit 112, a timing adjustment unit 113, a Pb multiplier 114, a Pr multiplier 115, a Pb adder 116, and a Pr adder 117 to be described later are the same as in FIG. 1, and a description thereof will be omitted.

The Pb multiplier 114 performs processing of increasing or lowering the chroma of the Pb signal of a processing target pixel, and the Pr multiplier 115 performs processing of increasing or lowering the chroma of the Pr signal of the processing target pixel. The Pb adder 116 shifts the blue hue of the Pb signal of the processing target pixel so as to increase or decrease, and the Pr adder 117 shifts the blue hue of the Pr signal of the processing target pixel so as to increase or decrease. Since the Pb and Pr signals are delayed with respect to the Y signal of the processing target pixel by the arithmetic processing of the chroma and hue, the timing adjustment unit 113 adjusts the timing to the Y signal.

The chroma correction coefficients and the hue correction coefficients output from the correction coefficient conversion unit 111 are the same as in the graphs and calculations described in the first and second embodiments, and a description thereof will be omitted. In this embodiment, clipped chroma hardly occurs when chroma processing is performed first, and hue processing is performed later. In this embodiment, processing can be executed by a circuit arrangement smaller than that of the third embodiment.

In the above embodiments, an example in which the present invention is applied mainly to the display apparatus side has been described. However, the present invention is also applicable to the shooting apparatus side or image recording side. When the present invention is applied to the shooting apparatus, the ratio of the dynamic range of human vision to a target to the dynamic range when shooting the target and recording an image is corrected. The dynamic range of vision is 1,000,000 times or more when adaptation is taken into consideration, and 10,000 times to 100,000 times without adaptation. If the dynamic range in shooting and recording by the shooting apparatus is 2,000 times, an image that apparently has a dynamic range of 10,000 times can be recorded by processing the chroma and hue using image processing of the present invention so as to attain a dynamic range equivalent to five times. Even in a display apparatus having a dynamic range of, for example, 500 times, the thus processed and recorded image undergoes chroma and hue processing using image processing of the present invention so as to attain a dynamic range apparently extended by four times. As described above, if the present invention is applied to each of the shooting side and the display side, the user views, on the display apparatus having a dynamic range of 500 times, an image with such a chroma and hue that shows the image with a dynamic range of 10,000 times close to the dynamic range of vision.

The present invention is also applicable to a printing apparatus. In the printing apparatus, the reflectance of black ink or black toner is several percentages, and the reflectance of paper is about 90%. Hence, the dynamic range of a printed product is several ten times. When the present invention is applied to the printing apparatus, the ratio of the assumed value of the dynamic range of an input image to the dynamic range of the printed product is corrected. That is, the printing apparatus corrects the ratio of the dynamic range of human vision to a target to the dynamic range when shooting the target and recording an image. For example, if the dynamic range of the printed product is 30 times, and the assumed dynamic range of the input image is 2,000 times, the printing apparatus performs the image processing of the present invention by setting the correction ratio to 67. A printed product obtained after image processing apparently has such a chroma and hue that show the image with a dynamic range of 2,000 times.

While arrangement examples for implementing the present invention have been described with reference to the embodiments, the arrangements for implementing the gist of the present invention are not limited to the embodiments. For example, it is obvious that the same image processing as in the above embodiments can be performed using a microprocessor and a memory. In this case, the arrangement is suitable for a still image or a moving image with a low resolution because the processing takes time. However, if the processing speed of the microprocessor is sufficiently high, a moving image with a high resolution can also be processed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-205700, filed Oct. 6, 2014, which is hereby incorporated by reference herein in its entirety.

The invention claimed is:

1. An image processing apparatus for displaying an image on a display screen, the image processing apparatus comprising:

an input unit configured to input color image data;

an obtaining unit configured to obtain, as tone information of a pixel of interest to be processed in the image from the color image data input by the input unit, an average of signals of the pixel of interest and pixels around the pixel of interest;

a correction unit configured to execute correction processing of increasing a chroma of a color indicated by the signals of the pixel of interest according to the tone information so that, from a predetermined value to a maximum value which can be taken as an average of signals in the color image data, the higher a brightness indicated by the tone information is, the larger a magnification of a chroma increases; and a display control unit configured to display, on the display screen, an image based on corrected image data that has undergone correction by the correction unit.

2. The apparatus according to claim 1, further comprising an estimation unit configured to estimate, based on display dynamic range information corresponding to the display screen and dynamic range information corresponding to an image represented by the image data, a dynamic range reduction ratio, wherein the correction unit controls the correction processing in accordance with the dynamic range reduction ratio.

3. The apparatus according to claim 2, wherein a correction amount of the correction processing by the correction unit in a case where the dynamic range reduction ratio is not less than a predetermined value is greater than the correction amount in a case where the dynamic range reduction ratio is less than the predetermined value.

4. The apparatus according to claim 2, further comprising an illuminance acquisition unit configured to acquire information about brightness around the display screen, wherein the estimation unit estimates, based on display dynamic range information, dynamic range information corresponding to the image, and information acquired by the illuminance acquisition unit, the dynamic range reduction ratio.

5. The apparatus according to claim 2, wherein the correction unit uses dynamic range information defined by a standard as dynamic range information corresponding to the image.

6. The apparatus according to claim 1, wherein the obtaining unit obtains, based on pixel data of a neighboring pixel that exists within a predetermined range from the pixel of interest out of the image data input by the input unit, tone information of the pixel of interest.

7. The apparatus according to claim 1, wherein the correction unit comprises:

a chroma increasing unit configured to execute the first chroma processing of increasing the chroma of a color indicated by the signals of the pixel of interest out of the image data input by the input unit and obtaining chroma-increased pixel data;

a chroma decreasing unit configured to execute the second chroma processing of lowering the chroma of a color indicated by the signals of the pixel of interest out of the image data input by the input unit and obtaining chroma-decreased pixel data;

a ratio determination unit configured to determine, based on tone information of the pixel of interest out of the image data input by the input unit, a mixing ratio of the chroma-increased pixel data obtained by the chroma increasing unit, the chroma-decreased pixel data obtained by the chroma decreasing unit, and a signal of the pixel of interest; and a generation unit configured to generate pixel data that has undergone the first chroma processing by mixing the chroma-increased pixel data, the chroma-decreased pixel data, and a signal of the pixel of interest based on the mixing ratio determined by the ratio determination unit.

8. An image processing method of displaying an image on a display screen, the method comprising:

inputting color image data;

obtaining, as tone information of a pixel of interest to be processed in the image from the input color image data, an average of signals of the pixel of interest and pixels around the pixel of interest;

executing correction processing of increasing a chroma of a color indicated by the signals of the pixel of interest according to the tone information so that, from a predetermined value to a maximum value which can be taken as an average of signals in the color image data, the higher a brightness indicated by the tone information is, the larger a magnification of a chroma increases; and displaying, on the display screen, an image based on corrected image data that has undergone the correction processing.

9. The method according to claim 8, further comprising estimating, based on display dynamic range information corresponding to the display screen and dynamic range information corresponding to an image represented by the image data, a dynamic range reduction ratio, wherein the correction processing is controlled in accordance with the dynamic range reduction ratio.

10. The method according to claim 9, wherein a correction of the correction processing in a case where the dynamic range reduction ratio is not less than a predetermined value is greater than the correction amount in a case where the dynamic range reduction ratio is less than the predetermined value.

11. A non-transitory computer-readable storage medium storing a computer program for causing a computer to execute a method comprising:

inputting color image data;

obtaining, as tone information of a pixel of interest to be processed in the image from the input color image data, an average of signals of the pixel of interest and pixels around the pixel of interest;

executing correction processing of increasing a chroma of a color indicated by the signals of the pixel of interest according to the tone information so that, from a predetermined value to a maximum value which can be taken as an average of signals in the color image data, the higher a brightness indicated by the tone information is, the larger a magnification of a chroma increases; and displaying, on the display screen, an image based on corrected image data that has undergone the correction processing.

12. The storage medium according to claim 11, wherein the program causes the computer to execute estimating, based on display dynamic range information corresponding to the display screen and dynamic range information corresponding to an image represented by the image data, a dynamic range reduction ratio, and wherein the correction processing is controlled in accordance with the dynamic range reduction ratio.

13. The storage medium according to claim 12, wherein a correction amount of the correction processing in a case where the dynamic range reduction ratio is not less than a predetermined value is greater than the correction amount in a case where the dynamic range reduction ratio is less than the predetermined value.

14. The apparatus according to claim 2, wherein the correction unit controls the correction processing so that an increase in magnification in the correction processing is less than of a reciprocal of the dynamic range reduction ratio.

15. The apparatus according to claim 1, wherein the correction unit does not execute correction processing of increasing a chroma of a color indicated by the signals of the pixel of interest in a case where tone information of the pixel of interest is equal to or less than a first tone.

16. The apparatus according to claim 15, wherein the correction unit does not execute correction processing of decreasing a chroma of a color indicated by the signals of the pixel of interest according to the tone information in a case where tone information of the pixel of interest is equal to or less than a second tone.

17. The apparatus according to claim 15, wherein the correction unit executes correction processing of decreasing a chroma of a color indicated by the signals of the pixel of interest according to the tone information so that an reduction in magnification of a chroma in a pixel in which brightness indicated by the tone information is high becomes larger than an reduction in magnification of a chroma in a pixel in which brightness indicated by the tone information is low.

18. The apparatus according to claim 1, wherein the predetermined value is a value set according to an average of all the pixels in the color image data.

19. The apparatus according to claim 7, wherein the ratio determination unit determines a first usage ratio for an output from the chroma increasing unit and a second usage ratio for an output from the chroma decreasing unit, and
wherein the ratio determination unit sets the first usage ratio to 0 with respect to the predetermined value and sets the first usage ratio to 1 with respect to the maximum value which can be taken as an average of signals in the color image data, and determines the first usage ratio so that, from a predetermined value to the maximum value which can be taken as an average of signals in the color image data, the first usage ratio increases linearly as the brightness indicated by the tone information becomes brighter.

20. The apparatus according to claim 19, wherein the ratio determination unit sets the second usage ratio to 0 with respect to a second predetermined value and sets the second usage ratio to 1 with respect to a minimum value which can be taken as an average of signals in the color image data, and determines the second usage ratio so that, from the minimum value which can be taken as an average of signals in the color image data to the second predetermined value, the second usage ratio decreases linearly as the brightness indicated by the tone information becomes brighter.

* * * * *